(12) United States Patent
Nessett et al.

(10) Patent No.: US 7,480,939 B1
(45) Date of Patent: Jan. 20, 2009

(54) ENHANCEMENT TO AUTHENTICATION PROTOCOL THAT USES A KEY LEASE

(75) Inventors: Danny M. Nessett, Fremont, CA (US); Albert Young, Cupertino, CA (US)

(73) Assignee: 3Com Corporation, Marlborough, MA (US)

( * ) Notice: Subject to any disclaimer, the term of this patent is extended or adjusted under 35 U.S.C. 154(b) by 441 days.

(21) Appl. No.: 09/900,617

(22) Filed: Jul. 6, 2001

Related U.S. Application Data

(63) Continuation-in-part of application No. 09/561,416, filed on Apr. 28, 2000.

(51) Int. Cl.
*G06F 12/14* (2006.01)
*H04L 9/00* (2006.01)
*H04K 1/00* (2006.01)
*H04M 1/66* (2006.01)

(52) U.S. Cl. .................. 726/22; 713/155; 713/158; 713/168; 713/171; 380/247; 380/255; 380/277; 455/410; 455/411

(58) Field of Classification Search .............. 713/200, 713/168, 171, 201
See application file for complete search history.

(56) References Cited

U.S. PATENT DOCUMENTS

| | | | | |
|---|---|---|---|---|
| 5,371,794 A | * | 12/1994 | Diffie et al. ............... | 713/156 |
| 5,434,918 A | * | 7/1995 | Kung et al. ............... | 713/169 |
| 5,633,933 A | * | 5/1997 | Aziz ........................ | 380/30 |
| 5,737,419 A | * | 4/1998 | Ganesan ................... | 713/169 |
| 5,794,139 A | * | 8/1998 | Mizikovsky et al. ....... | 455/403 |
| 5,850,444 A | * | 12/1998 | Rune ........................ | 705/79 |
| 5,864,667 A | * | 1/1999 | Barkan ..................... | 713/201 |
| 5,917,911 A | * | 6/1999 | Dabbish et al. ............ | 380/286 |
| 5,999,711 A | * | 12/1999 | Misra et al. ............... | 726/4 |
| 6,058,477 A | * | 5/2000 | Kusakabe et al. .......... | 713/169 |
| 6,122,639 A | * | 9/2000 | Babu et al. ................ | 707/103 R |
| 6,151,679 A | * | 11/2000 | Friedman et al. .......... | 726/3 |

(Continued)

FOREIGN PATENT DOCUMENTS

EP          1422875 A2 *   5/2004

(Continued)

OTHER PUBLICATIONS

Musacchio et al, WiFi Access Point Pricing as a Dynamic Game, 2004, ACM pp. 289-301.*

(Continued)

*Primary Examiner*—Christopher A Revak
*Assistant Examiner*—Aravind K Moorthy

(57) ABSTRACT

A method and system for using a key lease in a secondary authentication protocol after a primary authentication protocol has been performed is described. In one embodiment, the primary authentication protocol comprises a strong, secure, computationally complex authentication protocol. Moreover, the secondary authentication protocol comprises a less complex (compared to the primary authentication protocol) and less secure (compared to the primary authentication protocol) authentication protocol which can be performed in a length of time that is shorter than a length of time required to perform the primary authentication protocol. In an embodiment, the key lease includes context information. Moreover, a new session encryption key is computed after each time a quick re-authentication is performed by executing the secondary authentication protocol using the key lease, whereas the session encryption key is used for encrypting communication traffic, providing a solution to the potential communication traffic replay threat.

9 Claims, 12 Drawing Sheets

U.S. PATENT DOCUMENTS

| | | | |
|---|---|---|---|
| 6,198,824 B1 * | 3/2001 | Shambroom | 380/279 |
| 6,199,113 B1 * | 3/2001 | Alegre et al. | 709/229 |
| 6,233,608 B1 * | 5/2001 | Laursen et al. | 709/217 |
| 6,363,149 B1 * | 3/2002 | Candelore | 380/45 |
| 6,393,127 B2 * | 5/2002 | Vogler | 380/283 |
| 6,418,130 B1 * | 7/2002 | Cheng et al. | 370/331 |
| 6,516,316 B1 * | 2/2003 | Ramasubramani et al. | 707/9 |
| 6,580,906 B2 * | 6/2003 | Bilgic et al. | 455/422.1 |
| 6,609,198 B1 * | 8/2003 | Wood et al. | 713/155 |
| 6,628,786 B1 * | 9/2003 | Dole | 380/44 |
| 6,636,968 B1 * | 10/2003 | Rosner et al. | 713/178 |
| 6,754,702 B1 * | 6/2004 | Kennelly et al. | 709/223 |
| 6,789,147 B1 * | 9/2004 | Kessler et al. | 710/200 |
| 6,792,424 B1 * | 9/2004 | Burns et al. | 707/9 |
| 7,127,234 B2 * | 10/2006 | Ishii | 455/411 |
| 7,275,157 B2 * | 9/2007 | Cam Winget | 713/168 |
| 7,299,356 B2 * | 11/2007 | Mizrah | 713/169 |
| 2007/0264965 A1 * | 11/2007 | Taniguchi | 455/403 |
| 2008/0089519 A1 * | 4/2008 | Ekberg | 380/270 |
| 2008/0123856 A1 * | 5/2008 | Won et al. | 380/277 |

FOREIGN PATENT DOCUMENTS

| | | | |
|---|---|---|---|
| EP | 1517475 A1 * | 3/2005 | |
| WO | WO 2004079985 A1 * | 9/2004 | |

OTHER PUBLICATIONS

Shi et al, Authentication Control Point and Its Implications For Secure Processor Design, 2006, ACM, pp. 1-10.*

Kbar et al, Securing the Wireless LANs that is based on Distributed Resource Management against internal attacks, 2007, IEEE, pp. 98-102.*

* cited by examiner

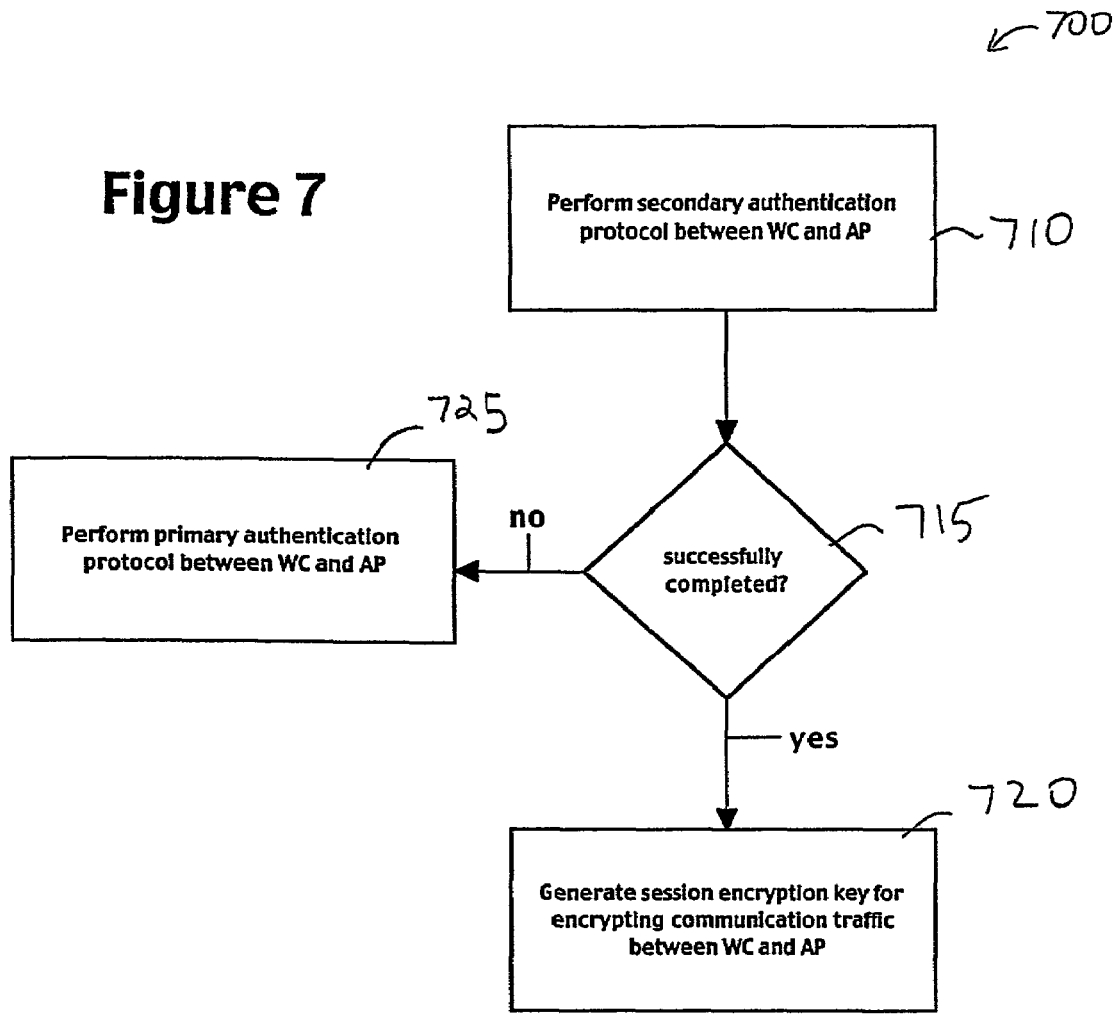

ENHANCEMENT TO AUTHENTICATION PROTOCOL THAT USES A KEY LEASE

CROSS REFERENCE TO RELATED APPLICATION

This patent application is a Continuation-in-Part of co-pending, commonly-owned U.S. patent application Ser. No. 09/561,416, filed on Apr. 28, 2000, entitled "USING A KEY LEASE IN A SECONDARY AUTHENTICATION PROTOCOL AFTER A PRIMARY AUTHENTICATION PROTOCOL HAS BEEN PERFORMED", by Nessett et al., which is incorporated herein by reference.

BACKGROUND OF THE INVENTION

1. Field of the Invention

The present invention generally relates to the field of networks. More particularly, the present invention relates to the field of network security.

2. Related Art

Computer systems and other electronic systems or devices (e.g., personal digital assistants, cellular phones, etc.) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system is dramatically enhanced by coupling these stand-alone electronic systems together to form a networking environment. Within a networking environment, users may readily exchange files, share information stored on a common database, pool resources, and communicate via electronic mail (e-mail) and via video teleconferencing.

In a network environment, there are three basic techniques used to achieve mutual authentication between two parties, whereas each party is an electronic system within the networked environment such as a wireless client electronic system or a network access point electronic system. In the first basic technique, public key cryptography is used. According to public key cryptography, the two parties sign (i.e., provide a digital signature for) a message using their respective private keys, while they authenticate (i.e., verify the origin of) the message using the other party's public key. In the second basic technique, the two parties hold a shared secret. Each party signs a message using the shared secret, while the other authenticates the message using the shared secret. In the third basic technique, the two parties hold a shared secret with a third-party such as an authentication authority. Each party signs the message using the third-party shared secret. The message is forwarded to the third party by the receiving party for verification or transformation. When the third-party verifies, it simply tells the receiving party whether the message is authentic. When the third-party transforms, it re-signs the message with the receiving party's shared secret, returning it to the receiving party for verification.

Each of the three basic techniques has its strengths and weaknesses. From a purely security perspective, implementing public key cryptography is preferred over the other basic techniques. However, public key cryptography requires a significant public key infrastructure. For particular applications that do not need this public key infrastructure for other purposes (e.g., IPSec), deployment of the public key infrastructure can create a significant market barrier to prospective customers of network environment equipment.

The next preferred basic technique from a security perspective implements a secret shared between two parties. This basic technique is inferior to public key cryptography because signing a message with such a shared secret does not actually authenticate the sender of the message. This basic technique just raises the receiving party's confidence that the sender of the message knows the shared secret. This may seem like an insignificant distinction, but there are certain types of attacks against authentication protocols by using shared secrets (e.g., reflection attacks) that complicate those authentication protocols.

The third basic technique, i.e., implementing secrets shared with a third-party, is the least attractive from a security perspective. However, the third basic technique is, in many cases, the most attractive approach from a management and deployment point of view. The use of public key cryptography and shared secrets imposes non-trivial administration burdens on the deploying organization. As previously indicated, public key cryptography normally requires the deployment of a Public Key Infrastructure, which is costly from an initial investment as well as an operational perspective. Pair wise shared secrets require extensive management of those secret keys, since each sending party must obtain, store, and manage (e.g., revoke) the secret keys shared with all other parties in the network environment. When implementing secrets shared with a third party, each party need only obtain and store one secret key. Many secret key management functions can be centralized in the third-party itself.

In a wireless network that requires a client electronic system (which is mobile and is capable of roaming) to authenticate itself to the wireless network before the client electronic system is allowed to use the resources of the wireless network, the repeated use of strong, computationally complex authentication methods can be a significant burden to both the client electronic system and the wireless network. In particular, a client electronic system that is roaming may be unable to authenticate itself to a network access point electronic system of the wireless network because the strong, computationally complex authentication method may require a longer period of time to complete than the period of time available before the client electronic system switches to another network access point electronic system of the wireless network. Typically, the strong, computationally complex authentication method may take a few seconds to complete.

Therefore, what is needed is a method and system for using a key lease in a secondary authentication protocol after a primary authentication protocol has been performed.

SUMMARY OF THE INVENTION

Accordingly, the present invention provides a method and system for using a key lease in a secondary authentication protocol after a primary authentication protocol has been performed. In one embodiment, the primary authentication protocol comprises a strong, secure, computationally complex authentication protocol. Moreover, the secondary authentication protocol comprises a less complex (compared to the primary authentication protocol) and less secure (compared to the primary authentication protocol) authentication protocol which can be performed in a length of time that is shorter than a length of time required to perform the primary authentication protocol. In one embodiment, a wireless client electronic system (WC) completes the primary authentication protocol with a wireless network access point electronic system of a wireless network (AP). When the WC is required to authenticate with another AP, the WC authenticates itself with another AP by using the secondary authentication protocol. However, the WC is required to periodically complete the primary authentication protocol, guarding against the possibility that the secondary authentication protocol may be exploited by an unauthorized intruder to attack the wireless network. In one embodiment, a third party technique is implemented to store a key necessary to perform the secondary authentication protocol.

Once the primary authentication protocol is completed by the WC and an AP, the AP transmits a key lease to the WC. In one embodiment, the key lease comprises a data structure having a plurality of data for enabling the WC to authenticate itself with another AP. The key lease is encrypted with a key which the WC does not possess and which the WC cannot obtain. Moreover, the key lease is valid for a period determined by a key lease period which is included in the key lease. In one embodiment, the key lease is encrypted with one of a plurality of keys. The third party stores the plurality of keys. Moreover, the third party transmits an appropriate one of the plurality of keys to the AP to enable the WC and the AP to perform the secondary authentication protocol if the key lease period has not expired. In one embodiment, the wireless network access point electronic systems of the wireless network are divided into groups. Each group is assigned a separate key for encrypting the key lease.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 7 illustrates a flow chart showing a method of protecting communication security when using a key lease to re-authenticate after a primary authentication protocol has been performed in accordance with an embodiment of the present invention.

Figure 1:
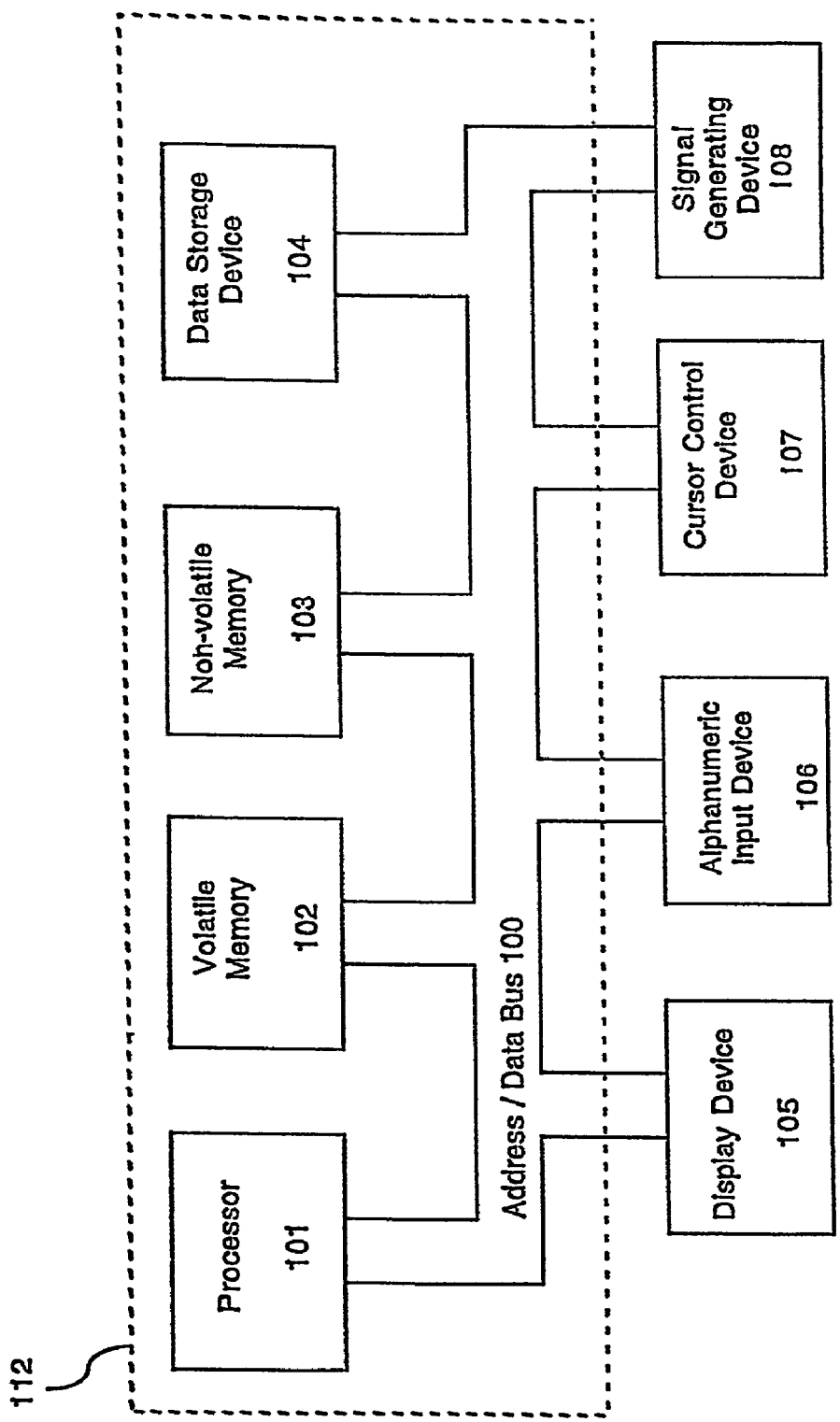
FIG. 1 illustrates an exemplary electronic system platform upon which embodiments of the present invention may be practiced.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, terms are utilized to refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System

With reference to FIG. 1, portions of the present invention are comprised of computer-readable and computer executable instructions which reside, for example, in computer-usable media of an electronic system such as a computer system. FIG. 1 illustrates an exemplary electronic system 112 on which embodiments of the present invention may be practiced. It is appreciated that the electronic system 112 of FIG. 1 is exemplary only and that the present invention can operate within a number of different computer systems including general-purpose computer systems and embedded computer systems.

Electronic system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Electronic system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of electronic system 112 include volatile memory 102, non-volatile memory 103 and data storage device 104.

Electronic system 112 can further include an optional signal generating device 108 (e.g., a wireless network interface card "NIC") coupled to the bus 100 for interfacing with other computer systems. Also included in exemplary system 112 of FIG. 1 is an optional alphanumeric input device 106 including alphanumeric and function keys coupled to the bus 100 for communicating information and command selections to the central processor 101. Electronic system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Exemplary Network Environment

Figure 2:
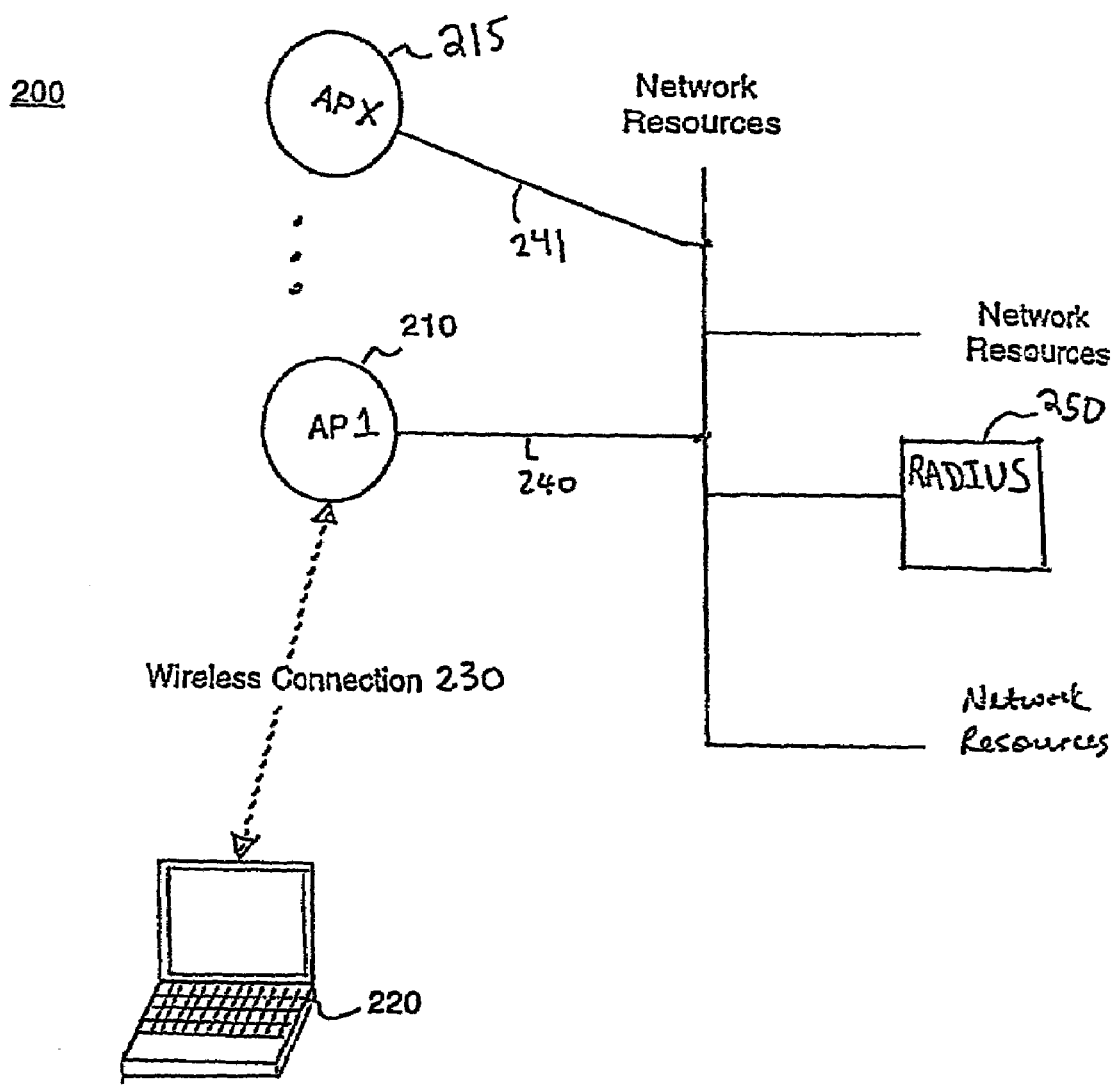
FIG. 2 is a graphical representation of an exemplary wireless network in which embodiments according to the present invention may be practiced.

Embodiments of the present invention, a method and system for using a key lease in a secondary authentication protocol after a primary authentication protocol has been performed, may be practiced in a wireless network environment. FIG. 2 illustrates an exemplary wireless network 200 in which embodiments of the present invention may be practiced. As illustrated, wireless network 200 includes a network access point electronic system (AP1) 210 that is coupled to a wireless client electronic system (WC) 220 via a wireless connection 230. More than one wireless client electronic system may be coupled to the wireless network 200. In addition, the wireless network 200 may include one or more additional network access point electronic systems (APX) 215. There are many techniques for implementing wireless connection 230, including infrared transmission, spread spectrum radio transmission, narrowband radio transmission, or some other technology that does not require a physical connection between the wireless client electronic system and the network access point electronic system. AP1 210 and APX 215 may be implemented with an electronic system (e.g., electronic system 112). In the present embodiment, the AP1 210 and APX 215 are coupled to a number of network resources (e.g., file servers, printers, Internet gateways, etc.) via connection 240 and connection 241 respectively.

Additionally, the wireless network 200 includes a RADIUS server 250. The RADIUS server 250 functions as a third party (i.e., an authentication resource) for enabling the WC 220 and a wireless network access point electronic system (e.g., AP1 210 or APX 215) to perform a secondary authentication protocol. In another embodiment, a shared secret key (for performing the secondary authentication protocol) can be stored locally by the wireless network access point electronic system (e.g., AP1 210 or APX 215) rather than being stored at a third party (e.g., RADIUS server 250). Moreover, the RADIUS server 250 can be utilized to enable the WC 220 and a wireless network access point electronic system (e.g., AP1 210 or APX 215) to perform a primary authentication protocol. The primary authentication protocol comprises a strong, secure, computationally complex authentication protocol.

In one embodiment, an authentication protocol described in the pending patent application "AUTHENTICATED DIFFIE-HELLMAN KEY AGREEMENT PROTOCOL WHERE THE COMMUNICATING PARTIES SHARE A SECRET WITH A THIRD PARTY" (Ser. No. 09/560,396, filed on Apr. 28, 2000) by Danny M. Nessett, Albert Young, Bob O'Hara, Joe Tsai, and Bofu Chen, assigned to the assignee of the present application), is implemented as the primary authentication protocol. In addition, the primary authentication protocol enables the WC 220 and the wireless network access point electronic system (e.g., AP1 210 or APX 215) to establish a first shared secret key for encrypting communications transmitted between the WC 220 and the wireless network access point electronic system (e.g., AP1 210 or APX 215). It should be understood that any other authentication protocol can be implemented as the primary authentication protocol. The secondary authentication protocol comprises a less complex (compared to the primary authentication protocol) and less secure (compared to the primary authentication protocol) authentication protocol which can be performed in a length of time that is shorter than a length of time required to perform the primary authentication protocol.

In some conventional wired networks where communication relies on physical security, a client electronic system may transmit and receive information (i.e., communicate) via the wired network without any encryption. However, in the wireless network 200, communications between the AP1 210 and the WC 220 can be easily intercepted by casual eavesdroppers and intruders. According to the present invention, the wireless network 200 requires the WC 220 to perform the primary authentication protocol with a wireless network access point electronic system (e.g., AP1 210 or APX 215). The primary authentication protocol facilitates establishing the first shared secret key between the WC 220 and the wireless network access point electronic system (e.g., AP1 210 or APX 215). The WC 220 may roam as it communicates with the wireless network 200.

Since the WC 220 moves from one physical location to a second physical location, the WC 220 may be required to authenticate once again if the WC 220 communicates with a second wireless network access point electronic system of the wireless network 200 (i.e., a wireless network access point electronic system other than the wireless network access point electronic system with which the WC 220 performed the primary authentication protocol). Rather than performing the primary authentication protocol once again, the present invention provides the secondary authentication protocol which the WC 220 performs with the second wireless network access point electronic system. A key lease (which is transmitted to the WC 220 after successfully completing the primary authentication protocol) facilitates directing the WC 220 to perform the proper authentication protocol (the primary authentication protocol or the secondary authentication protocol). Thus, the present invention enables the WC 220 to roam and to authenticate itself to a wireless network 200 without interrupting a communication connection with the wireless network 200.

Once the primary authentication protocol is successfully completed, a first wireless network access point electronic system (first AP) (e.g., AP1 210 or APX 215) transmits a key lease to the WC 220. In one embodiment, the key lease comprises a data structure.

Figure 2A:
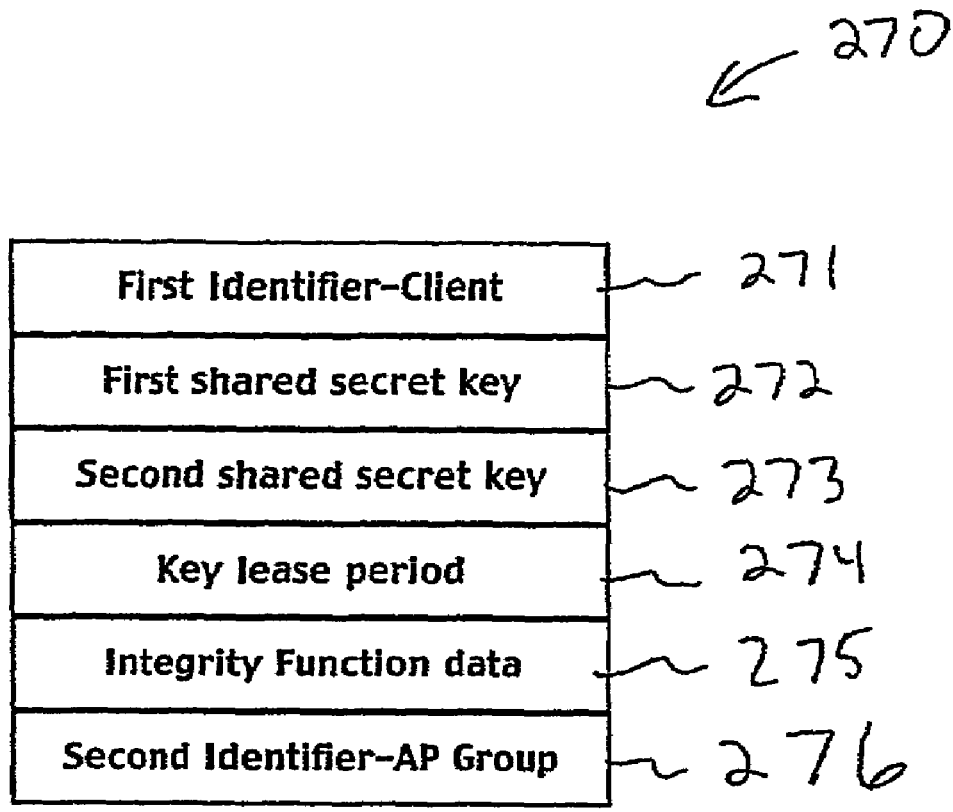
FIG. 2A illustrates a key lease according to an embodiment of the present invention.

FIG. 2A illustrates a key lease 270 according to an embodiment of the present invention. The key lease 270 includes a first identifier 271 associated with the WC 220 and utilized in the primary authentication protocol performed by the WC 220 with the first AP, the first shared secret key 272 established during the primary authentication protocol with the first AP, and a second shared secret key 273 for use in authenticating data communications transmitted between the WC 220 and a second wireless network access point electronic system (second AP) (e.g., AP1 210 or APX 215) during the secondary authentication protocol. In one embodiment, the first identifier 271 is a user identifier associated with the WC 220. In another embodiment, the first shared secret key 272 and the second shared secret key 273 are equivalent, thus minimizing the number of shared secret keys which need to be managed.

Moreover, the key lease 270 further comprises a key lease period 274 for indicating a length of time in which the key lease 270 is valid. During the lease key period 274, the WC 220 can perform the secondary authentication protocol with the second AP instead of performing the primary authentication protocol. If the key lease period 274 expires, the WC 220 is required to perform the primary authentication protocol with the second AP. The key lease period 274 can be any length of time. For example, the key lease period 274 can be 24 hours or 8 hours, whereas a long key lease period reduces the number of times that the WC 220 needs to perform the primary authentication protocol.

The key lease 270 also comprises integrity function data 275 for determining an unauthorized change to a first portion of the key lease 270. The integrity function data is generated by processing the first portion of the key lease 270 with an integrity function. The integrity function data is utilized to reveal any tampering with the first portion of the key lease 270. In one embodiment, the first portion of the key lease 270 comprises the first identifier 271, the first shared secret key 272, the second shared secret key 273, and the key lease period 274.

The key lease 270 also comprises a second identifier 276 associated with a particular wireless network access point electronic system group. The second identifier facilitates dividing the plurality of wireless network access point electronic systems (e.g., AP1 210 and APX 215) into a plurality of wireless network access point electronic system groups. In one embodiment, a second portion of the key lease 270 is encrypted with a third shared secret key corresponding to the second identifier 276 associated with the wireless network access point electronic system (e.g., AP1 210 and APX 215) with which the WC 220 performed the primary authentication protocol. In one embodiment, the second portion of the key lease 270 comprises the first identifier 271, the first shared secret key 272, the second shared secret key 273, the key lease period 274, and the integrity function data 275.

In one embodiment, the third shared secret key is available to the RADIUS server 250 (or authentication resource) and to the wireless network access point electronic systems which belong to the wireless network access point electronic system group associated with the second identifier. Since WC 220 does not know the third shared secret key, WC 220 cannot decrypt the key lease, nor create another key lease. The RADIUS server 250 stores the third shared secret key corresponding to the second identifier. When the RADIUS server 250 receives a request for the third shared secret key from a wireless network access point electronic system (e.g., AP1 210 or APX 215), the RADIUS server 250 looks-up the third shared secret key corresponding to the second identifier of the wireless network access point electronic system. In one embodiment, the RADIUS server 250 authenticates the wireless network access point electronic system requesting the third shared secret key. It should be understood by one of ordinary skill in the art that the third party or authentication resource can be implemented as a server other than a RADIUS server 250 or as any other appropriate implementation. In another embodiment, the third shared secret key can be stored locally by the wireless network access point electronic system rather than being stored at a third party (e.g., RADIUS server 250).

Figure 3:
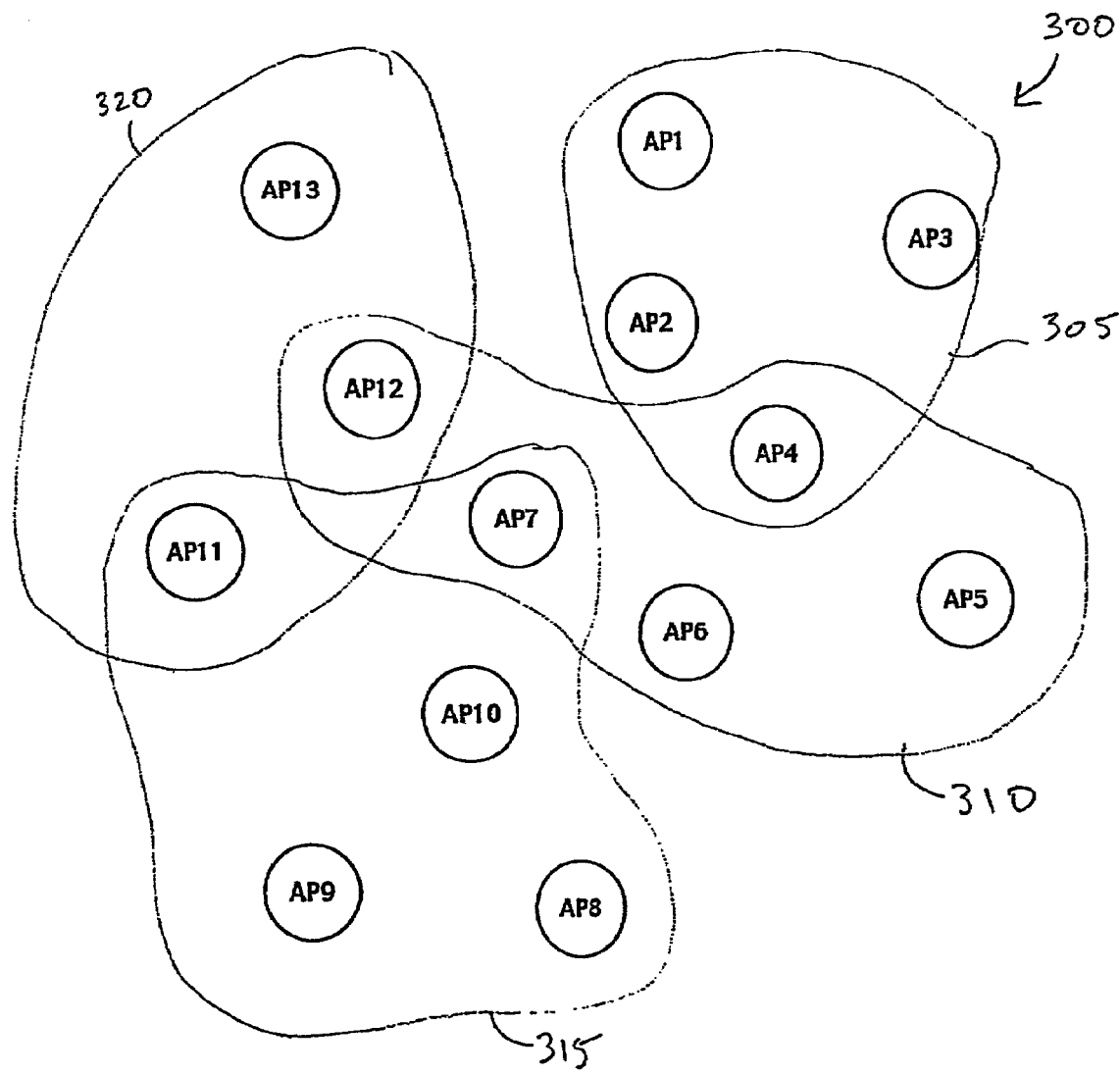
FIG. 3 is a graphical representation of the grouping of the wireless network access point electronic systems according to one embodiment of the present invention.

FIG. 3 is a graphical representation 300 of the grouping of the wireless network access point electronic systems AP1-AP13 of the wireless network 200 (FIG. 2) according to one embodiment of the present invention. As illustrated in FIG. 3, the first network access point electronic system group 305 includes AP1, AP2, AP3, and AP4. The second network access point electronic system group 310 includes AP4, AP5, AP6, AP7, and AP12. The third network access point electronic system group 315 includes AP8, AP9, AP10, and AP11. The fourth network access point electronic system group 320 includes AP11, AP12, and AP13. In one embodiment, a wireless network access point electronic system can belong to more than one network access point electronic system group (e.g., AP12, AP7, AP4, and AP11). It should be understood that the grouping of network access point electronic systems of FIG. 3 is merely exemplary. Each network access point electronic system group is associated with a second identifier.

As an example, if the WC 220 (FIG. 2) performs the primary authentication protocol with AP1, the WC 220 can authenticate itself with AP1, AP2, AP3, or AP4 using the secondary authentication protocol before the key lease period expires.

As an example, if the WC 220 (FIG. 2) performs the primary authentication protocol with AP13, the WC 220 can authenticate itself with AP11 or AP12 using the secondary authentication protocol before the key lease period expires.

As an example, if the WC 220 (FIG. 2) performs the primary authentication protocol with AP8, the WC 220 can authenticate itself with AP7, AP8, AP9, AP10, or AP11 using the secondary authentication protocol before the key lease period expires.

As an example, if the WC 220 (FIG. 2) performs the primary authentication protocol with AP5, the WC 220 can authenticate itself with AP4, AP5, AP6, AP7, or AP12 using the secondary authentication protocol before the key lease period expires.

In one embodiment, the secondary authentication protocol comprises a mutual challenge-response protocol based on symmetric encryption. In another embodiment, the secondary authentication protocol comprises a mutual challenge-response protocol based on a keyed message authentication code. In still another embodiment, the secondary authentication protocol comprises a mutual challenge-response protocol based on a one-way hash function message authentication code (HMAC) implementation (e.g., HMAC-MD5, HMAC-SHA-1, etc.). It should be understood by one skilled in the art that the secondary authentication protocol can be implemented in any other appropriate manner.

Using the Key Lease to Authenticate

Figure 4A:
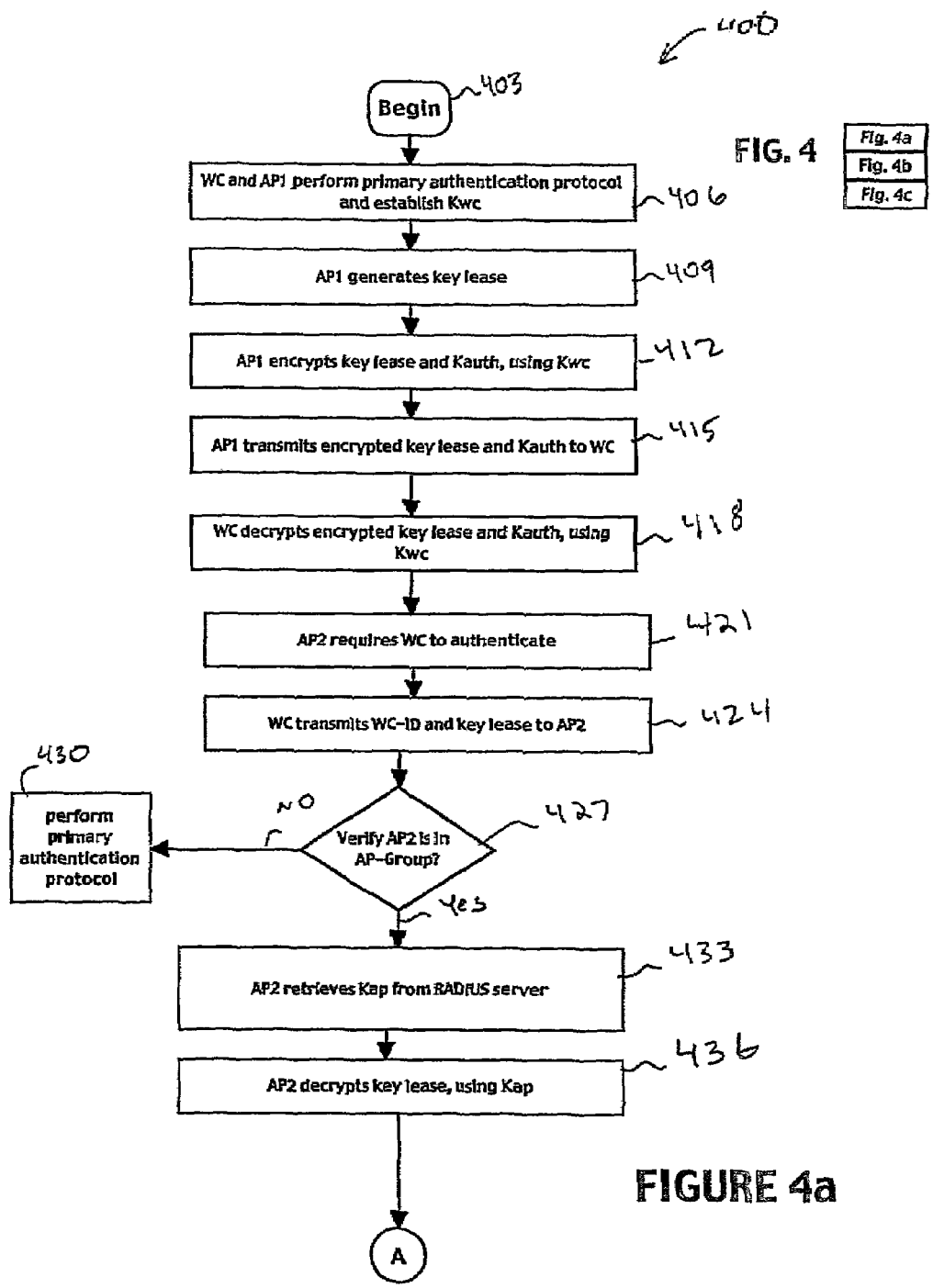
FIG. 4 is a flow chart diagram illustrating steps of authenticating a wireless client electronic system in accordance with one embodiment of the present invention.
Figure 4B:
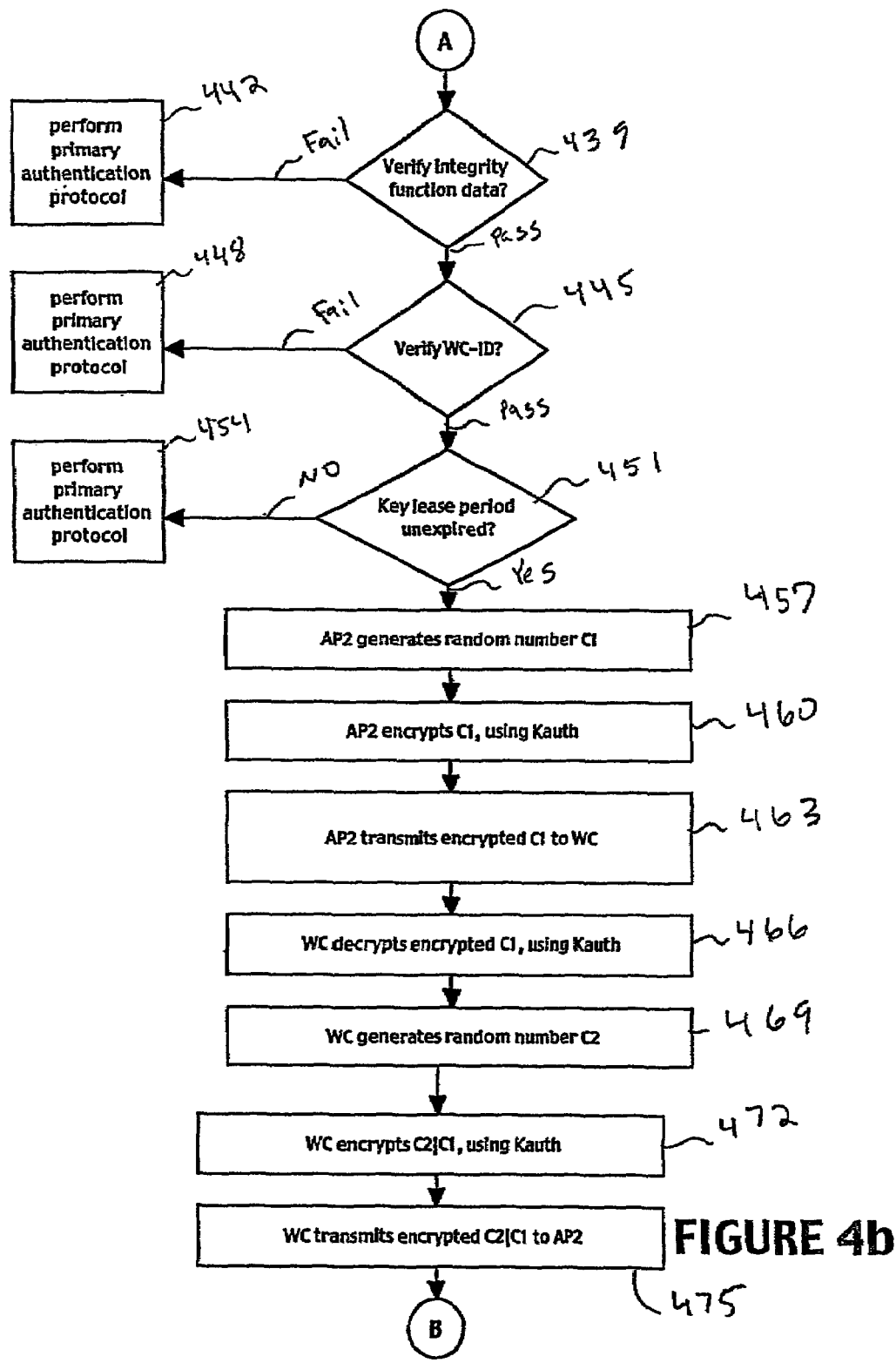
Figure 4C:
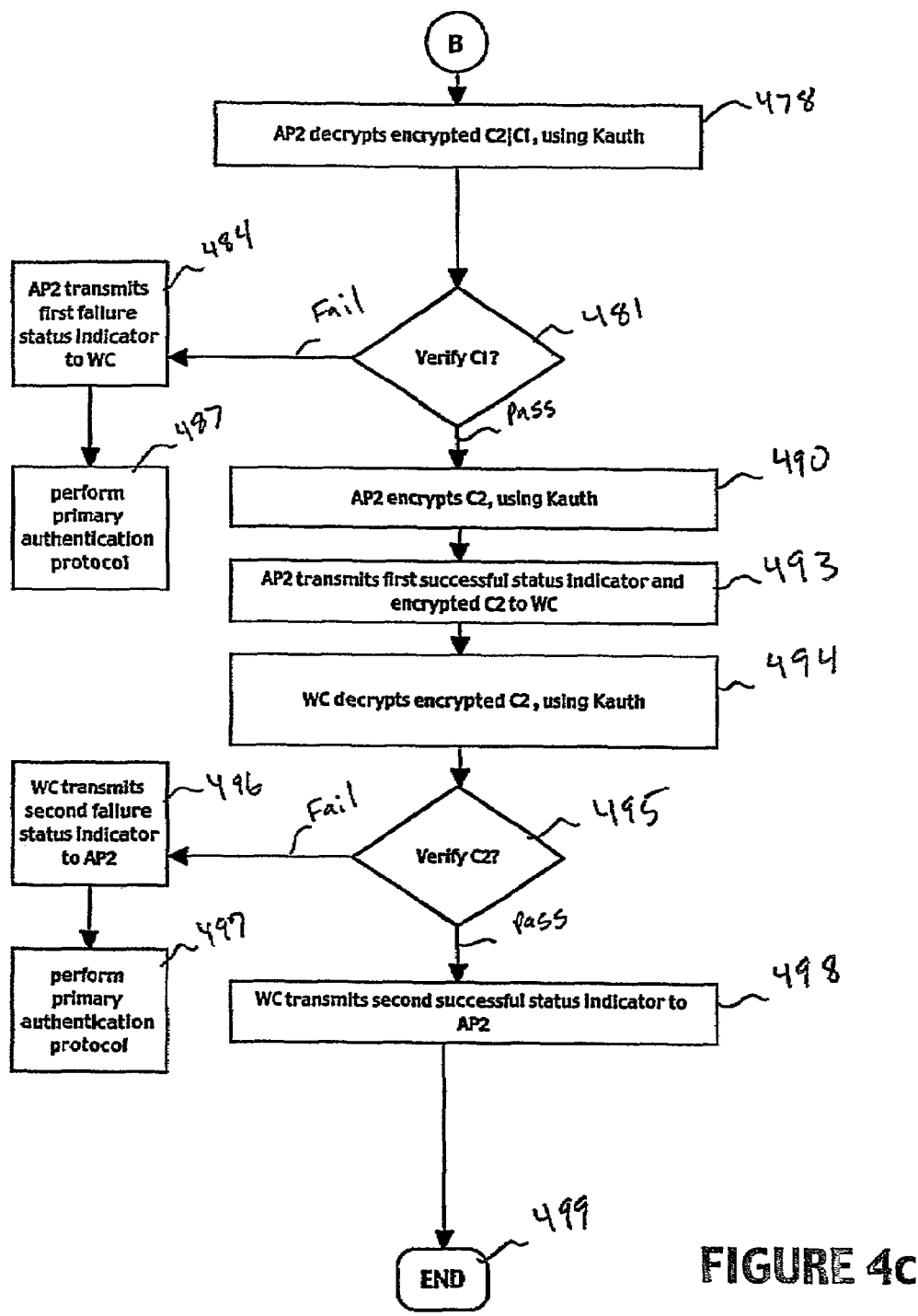

FIG. 4 is a flow chart diagram 400 illustrating steps of authenticating a wireless client electronic system (e.g., WC 220 of FIG. 2) to enable access to a wireless network 200 (FIG. 2) in accordance with one embodiment of the present invention. The WC 220 authenticates itself by performing either a primary authentication protocol or a secondary authentication protocol, depending on the data of the key lease.

At step 403, the method of authenticating the WC 220 according to one embodiment of the present invention begins. At step 406, the WC 220 authenticates itself to a first network access point electronic system (AP1) by performing a primary authentication protocol as discussed above. During the primary authentication protocol, WC 220 and AP1 establish a first shared secret key $K_{wc}$ for encrypting communications transmitted between WC 220 and AP1.

At step 409, AP1 generates the key lease. Alternatively, the authentication resource (e.g., RADIUS server 250) generates the first shared secret $K_{wc}$, a second shared secret key $K_{auth}$, and the key lease, and transmits via a secure encrypted channel the first shared secret $K_{wc}$, the second shared secret key $K_{auth}$, and the key lease to AP1. In one embodiment, the key lease comprises a first identifier WC-ID utilized during the primary authentication protocol, the first shared secret key $K_{wc}$, a second shared secret key $K_{auth}$, a key lease period, integrity function data, and a second identifier AP-GROUP associated with AP1, as discussed above. In one embodiment, the first identifier WC-ID, the first shared secret key $K_{wc}$, the second shared secret key $K_{auth}$, the key lease period, and the integrity function data are encrypted using a third shared secret key $K_{AP}$, whereas the third shared secret key $K_{AP}$ is available to AP1 but not to WC 220. The third shared secret key $K_{AP}$ corresponds to the second identifier AP-GROUP. In one embodiment, a RADIUS server 250 (FIG. 2) stores the third shared secret key $K_{AP}$. Since WC 220 does not know the third shared secret key $K_{AP}$, WC 220 cannot decrypt the key lease, nor create another key lease.

At step 412, AP1 encrypts the second shared secret key $K_{auth}$ and the key lease using the first shared secret key $K_{wc}$. In another embodiment, AP1 encrypts the second shared secret key $K_{auth}$ using the first shared secret key $K_{wc}$.

At step 415, AP1 transmits the encrypted second shared secret key $K_{auth}$ and the encrypted key lease (i.e., encrypted with the first shared secret key $K_{wc}$ and the third shared secret key $K_{AP}$) to WC 220. In another embodiment, AP1 transmits the encrypted second shared secret key $K_{auth}$ and the key lease (i.e., encrypted with the third shared secret key $K_{AP}$) to WC 220.

At step 418, WC 220 decrypts the encrypted second shared secret key $K_{auth}$ and the encrypted key lease using the first shared secret key $K_{wc}$. In another embodiment, WC 220 decrypts the encrypted second shared secret key $K_{auth}$ using the first shared secret key $K_{wc}$. At step 421, a second wireless network access point electronic system (AP2) requests to authenticate WC 220 because WC 220 is now communicating with AP2 rather than AP1, since WC 220 has moved from one physical location to a second physical location.

At step 424, WC 220 transmits the first identifier WC-ID and the key lease to AP2. In another embodiment, the WC 220 transmits the key lease to AP2. In this embodiment, AP2 determines the first identifier WC-ID from a media access control (MAC) address associated with WC 220.

At step 427, AP2 locates the second identifier AP-GROUP of the key lease and determines whether the second identifier AP-GROUP of the key lease is associated with AP2 since the first identifier WC-ID, the first shared secret key $K_{wc}$, the second shared secret key $K_{auth}$, the key lease period, and the integrity function data are encrypted using the third shared secret key $K_{AP}$. At step 430, if the second identifier AP-GROUP of the key lease is not associated with AP2, WC 220 performs the primary authentication protocol with AP2. Otherwise, at step 433, AP2 retrieves the third shared secret key $K_{AP}$ corresponding to the second identifier AP-GROUP from the RADIUS server 250. In another embodiment, the third shared secret key $K_{AP}$ can be stored locally by AP2 rather than being stored at a third party (e.g., RADIUS server 250). In still another embodiment, AP2 maintains and stores the third shared secret key $K_{AP}$ after retrieving the third shared secret key $K_{AP}$ from the RADIUS server 250 during a prior interaction with the RADIUS server 250.

At step 436, AP2 decrypts the lease key using the third shared secret key $K_{AP}$. At step 439, AP2 verifies the integrity function data by processing the first portion of the lease key with an integrity function. At step 442, if the verification is unsuccessful, WC 220 performs the primary authentication protocol with AP2. Otherwise, at step 445, AP2 verifies that the first identifier WC-ID transmitted by WC 220 matches the first identifier WC-ID decrypted from the lease key. At step 448, if the verification is unsuccessful, WC 220 performs the primary authentication protocol with AP2. Otherwise, at step 451, AP2 verifies that the key lease period has not expired. At step 454, if the key lease period has expired, WC 220 performs the primary authentication protocol with AP2. Otherwise, WC 220 performs the secondary authentication protocol with AP2.

In one embodiment, the secondary authentication protocol comprises a mutual challenge-response protocol based on symmetric encryption. In another embodiment, the secondary authentication protocol comprises a mutual challenge-response protocol based on a keyed message authentication code. In still another embodiment, the secondary authentication protocol comprises a mutual challenge-response protocol based on a one-way hash function message authentication code (HMAC) implementation (e.g., HMAC-MD5, HMAC-SHA-1, etc.). It should be understood by one skilled in the art that the secondary authentication protocol can be implemented in any other appropriate manner.

At step 457, AP2 generates the random number C1. At step 460, AP2 encrypts the random number C1 using the second shared secret key $K_{auth}$. At step 463, in one embodiment, AP2 transmits the encrypted random number C1 to WC 220 in accordance with a challenge of a mutual challenge-response protocol.

At step 466, WC 200 decrypts the encrypted random number C1 using the second shared secret key $K_{auth}$. At step 469, WC 220 generates the random number C2. At step 472, WC 220 encrypts a concatenation comprising the random number C2 and the random number C1, using the second shared secret key $K_{auth}$. The encryption function E has the property that a first ciphertext generated (when the random number C2 is encrypted in step 472) is not the equivalent to a second ciphertext generated below in step 490. In one embodiment, the encryption of step 472 utilizes a first initialization vector while the encryption of step 490 utilizes a second initialization vector. Therefore, the encryption of the random number C2 in step 472 results in a ciphertext that is different from the ciphertext generated in step 490.

At step 475, in one embodiment, WC 220 transmits the encrypted concatenation to AP2 in accordance with a challenge of a mutual challenge-response protocol.

At step 478, AP2 decrypts the encrypted concatenation using the second shared secret key $K_{auth}$. At step 481, AP2 verifies that the decrypted random number C1 matches the random number C1 generated by AP2. At step 484, if the verification is unsuccessful, AP2 transmits a first failure status indicator to WC 220. At step 487, WC 220 performs the primary authentication protocol with AP2.

Otherwise, at step 490, AP2 encrypts the random number C2 using the second shared secret key $K_{auth}$. At step 493, AP2 transmits the encrypted random number C2 and a first successful status indicator to WC 220 in accordance with the mutual challenge-response protocol.

At step 494, WC 220 decrypts the encrypted random number C2 using the second shared secret key $K_{auth}$. At step 495, WC 220 verifies that the decrypted random number C2 matches the random number C2 generated by WC 220. At step 496, if the verification is unsuccessful, WC 220 transmits a second failure status indicator to AP2. At step 497, WC 220 performs the primary authentication protocol with AP2.

Otherwise, at step 498, WC 220 transmits a second successful status indicator to AP2 in accordance with the mutual challenge-response protocol.

At step 499, WC 220 has successfully completed the secondary authentication protocol. Now, WC 220 and AP2 can use the first shared secret key $K_{wc}$ to encrypt communications transmitted between WC 220 and AP2.

Figure 5A:
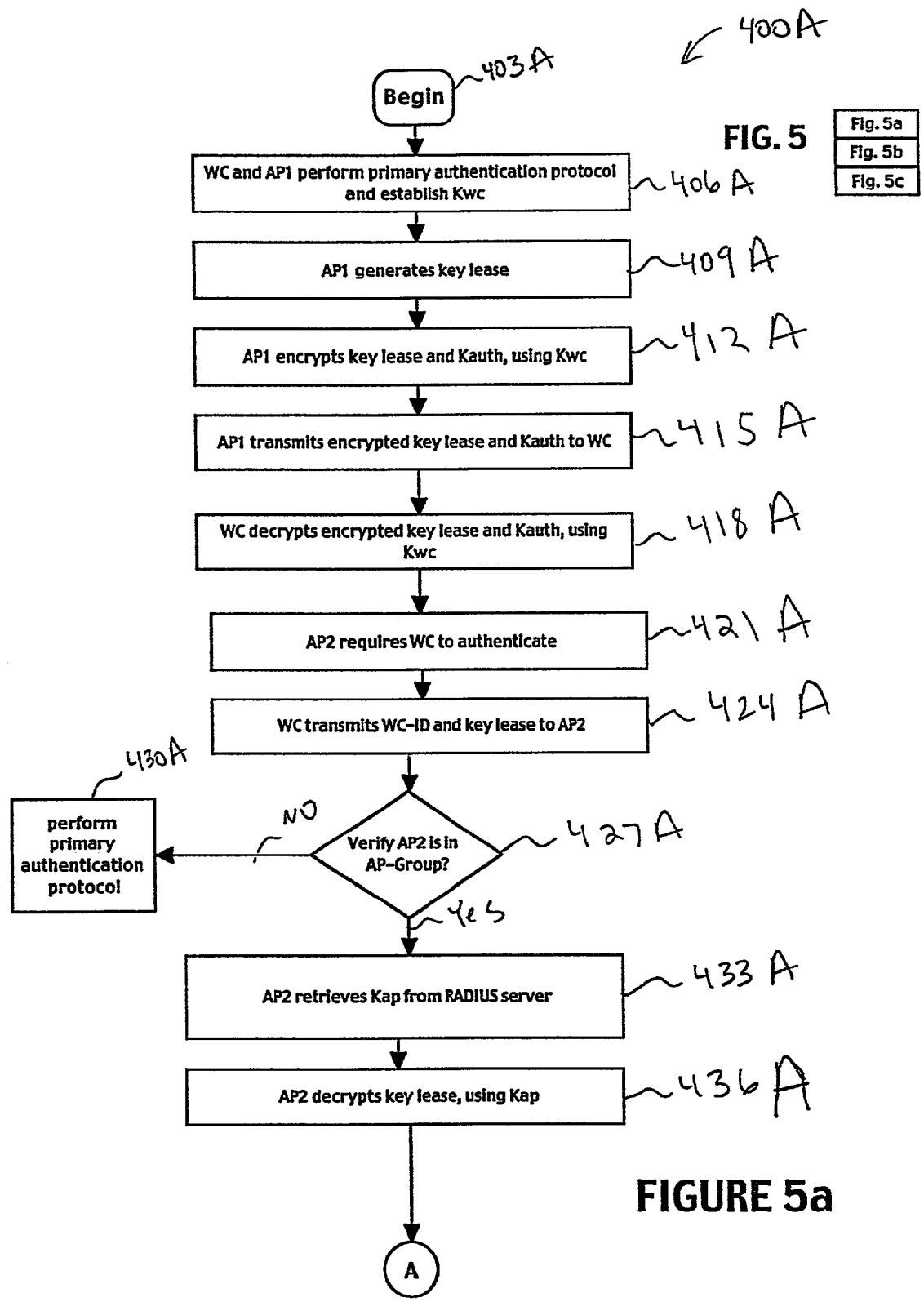
FIG. 5 is a flow chart diagram illustrating steps of authenticating a wireless client electronic system in accordance with a second embodiment of the present invention.
Figure 5B:
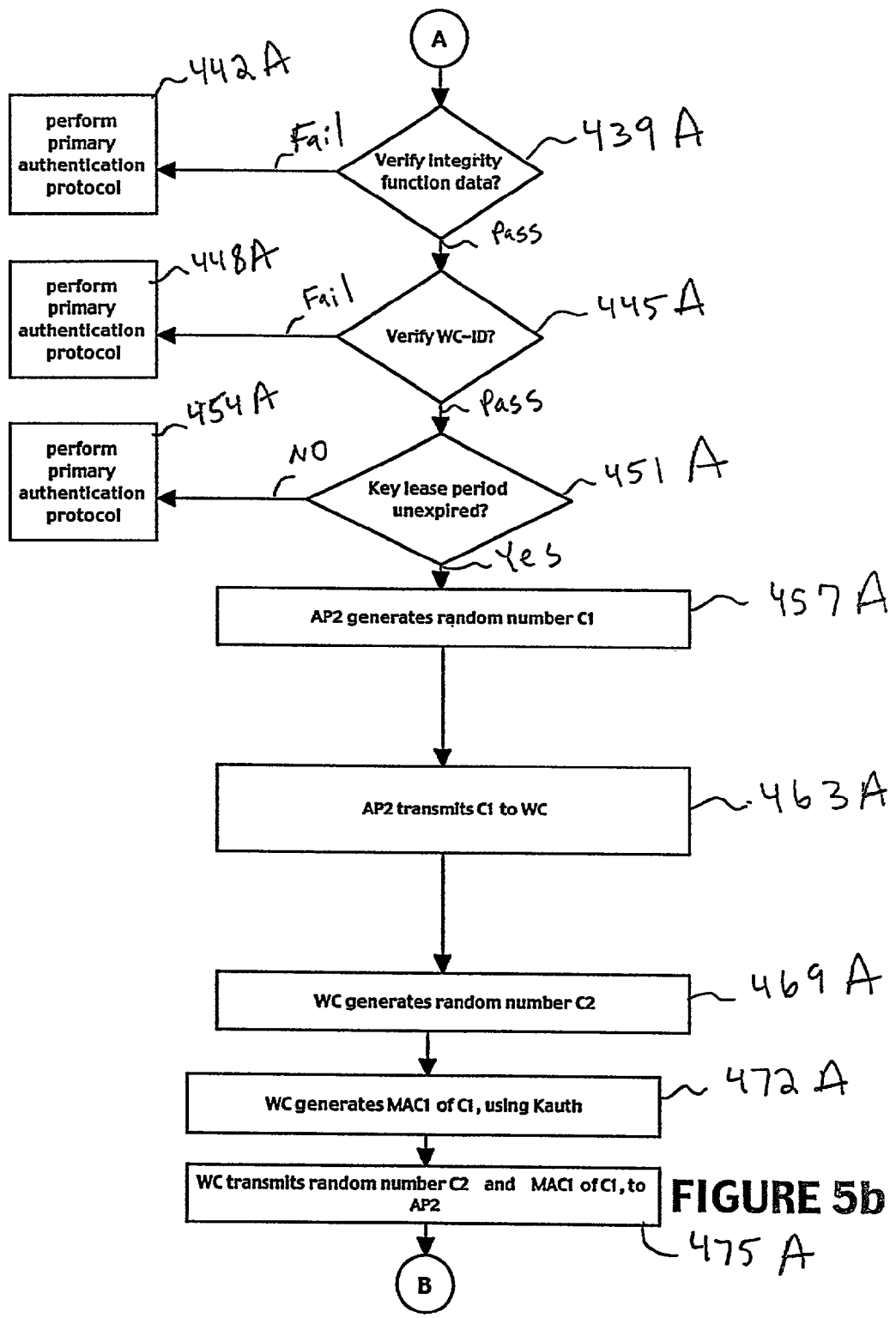
Figure 5C:
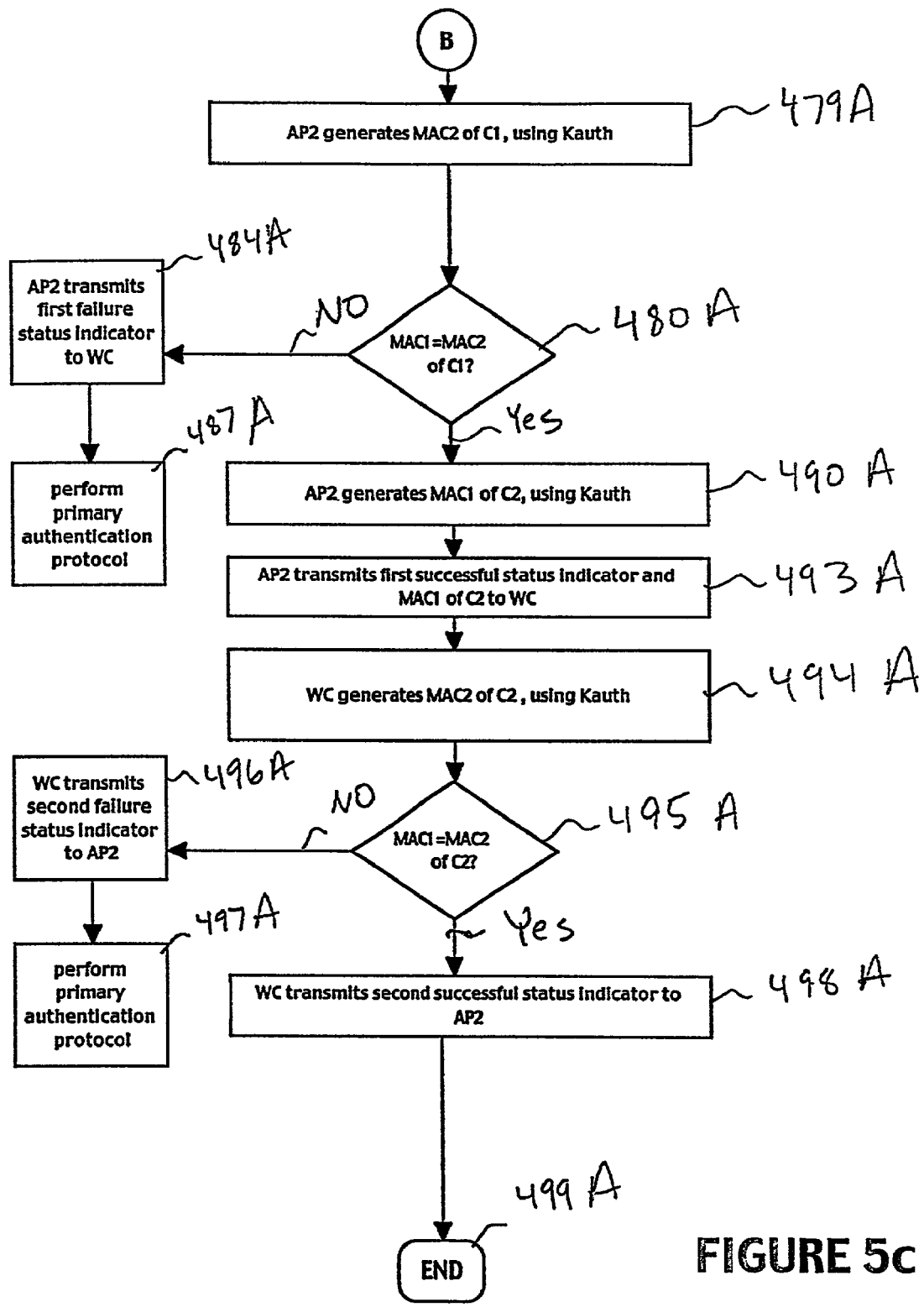

FIG. 5 is a flow chart diagram 400A illustrating steps of authenticating a wireless client electronic system (e.g., WC 220 of FIG. 2) to enable access to a wireless network 200 (FIG. 2) in accordance with a second embodiment of the present invention. The WC 220 authenticates itself by performing either a primary authentication protocol or a secondary authentication protocol, depending on the data of the key lease.

At step 403A, the method of authenticating the WC 220 according to a second embodiment of the present invention begins. At step 406A, the WC 220 authenticates itself to a first network access point electronic system (AP1) by performing a primary authentication protocol as discussed above. During the primary authentication protocol, WC 220 and AP1 establish a first shared secret key $K_{wc}$ for encrypting communications transmitted between WC 220 and AP1.

At step 409A, AP1 generates the key lease. Alternatively, the authentication resource (e.g., RADIUS server 250) generates the first shared secret $K_{wc}$, a second shared secret key $K_{auth}$, and the key lease, and transmits via a secure encrypted channel the first shared secret $K_{wc}$, the second shared secret key $K_{auth}$, and the key lease to AP1. In one embodiment, the key lease comprises a first identifier WC-ID utilized during the primary authentication protocol, the first shared secret key $K_{wc}$, a second shared secret key $K_{auth}$, a key lease period, integrity function data, and a second identifier AP-GROUP associated with AP1, as discussed above. In one embodiment, the first identifier WC-ID, the first shared secret key $K_{wc}$, the second shared secret key $K_{auth}$, the key lease period, and the integrity function data are encrypted using a third shared secret key $K_{AP}$, whereas the third shared secret key $K_{AP}$ is available to AP1 but not to WC 220. The third shared secret key $K_{AP}$ corresponds to the second identifier AP-GROUP. In one embodiment, a RADIUS server 250 (FIG. 2) stores the third shared secret key $K_{AP}$. Since WC 220 does not know the third shared secret key $K_{AP}$, WC 220 cannot decrypt the key lease, nor create another key lease.

At step 412A, AP1 encrypts the second shared secret key $K_{auth}$ and the key lease using the first shared secret key $K_{wc}$. In another embodiment, AP1 encrypts the second shared secret key $K_{auth}$ using the first shared secret key $K_{wc}$.

At step 415A, AP1 transmits the encrypted second shared secret key $K_{auth}$ and the encrypted key lease (i.e., encrypted with the first shared secret key $K_{wc}$ and the third shared secret key $K_{AP}$) to WC 220. In another embodiment, AP1 transmits the encrypted second shared secret key $K_{auth}$ and the key lease (i.e., encrypted with the third shared secret key $K_{AP}$) to WC 220.

At step 418A, WC 220 decrypts the encrypted second shared secret key $K_{auth}$ and the encrypted key lease using the first shared secret key $K_{wc}$. In another embodiment, WC 220 decrypts the encrypted second shared secret key $K_{auth}$ using the first shared secret key $K_{wc}$.

At step 421A, a second wireless network access point electronic system (AP2) requests to authenticate WC 220 because WC 220 is now communicating with AP2 rather than AP1, since WC 220 has moved from one physical location to a second physical location.

At step 424A, WC 220 transmits the first identifier WC-ID and the key lease to AP2. In another embodiment, the WC 220 transmits the key lease to AP2. In this embodiment, AP2 determines the first identifier WC-ID from a media access control (MAC) address associated with WC 220.

At step 427A, AP2 locates the second identifier AP-GROUP of the key lease and determines whether the second identifier AP-GROUP of the key lease is associated with AP2 since the first identifier WC-ID, the first shared secret key $K_{wc}$, the second shared secret key $K_{auth}$, the key lease period, and the integrity function data are encrypted using the third shared secret key $K_{AP}$. At step 430A, if the second identifier AP-GROUP of the key lease is not associated with AP2, WC 220 performs the primary authentication protocol with AP2. Otherwise, at step 433A, AP2 retrieves the third shared secret key $K_{AP}$ corresponding to the second identifier AP-GROUP from the RADIUS server 250. In another embodiment, the third shared secret key $K_{AP}$ can be stored locally by AP2 rather than being stored at a third party (e.g., RADIUS server 250). In still another embodiment, AP2 maintains and stores the third shared secret key $K_{AP}$ after retrieving the third shared secret key $K_{AP}$ from the RADIUS server 250 during a prior interaction with the RADIUS server 250.

At step 436A, AP2 decrypts the lease key using the third shared secret key $K_{AP}$. At step 439A, AP2 verifies the integrity function data by processing the first portion of the lease key with an integrity function. At step 442A, if the verification is unsuccessful, WC 220 performs the primary authentication protocol with AP2. Otherwise, at step 445A, AP2 verifies that the first identifier WC-ID transmitted by WC 220 matches the first identifier WC-ID decrypted from the lease key. At step 448A, if the verification is unsuccessful, WC 220 performs the primary authentication protocol with AP2. Otherwise, at step 451A, AP2 verifies that the key lease period has not expired. At step 454A, if the key lease period has expired, WC 220 performs the primary authentication protocol with AP2. Otherwise, WC 220 performs the secondary authentication protocol with AP2.

In this embodiment, rather than implementing the secondary authentication protocol as a mutual challenge-response protocol based on symmetric encryption, the secondary authentication protocol comprises a mutual challenge-response protocol based on a one-way hash function. In particular, the secondary authentication protocol comprises a mutual challenge-response protocol based on a keyed one-way message authentication code implementation (e.g., HMAC-MD5, HMAC-SHA-1, etc.). It should be understood by one skilled in the art that the secondary authentication protocol can be implemented in any other appropriate manner.

At step 457A, AP2 generates the random number C1. At step 463A, in one embodiment, AP2 transmits the random number C1 to WC 220 in accordance with a challenge of a mutual challenge-response protocol.

At step 469A, WC 220 generates the random number C2. At step 472A, WC 220 generates a first keyed one-way message authentication code (MAC) of the random number C1, using the second shared secret key $K_{auth}$.

At step 475A, in one embodiment, WC 220 transmits the random number C2 and the first keyed one-way message authentication code (MAC) of the random number C1 to AP2 in accordance with a challenge of a mutual challenge-response protocol.

At step 479A, AP2 generates a second keyed one-way message authentication code (MAC) of the random number C1, using the second shared secret key $K_{auth}$. At step 480A, AP2 verifies that the first keyed one-way message authentication code (MAC) of the random number C1 matches the second keyed one-way message authentication code (MAC) of the random number C1. At step 484A, if the verification is unsuccessful, AP2 transmits a first failure status indicator to WC 220. At step 487A, WC 220 performs the primary authentication protocol with AP2.

Otherwise, at step 490A, AP2 generates a first keyed one-way message authentication code (MAC) of the random number C2, using the second shared secret key $K_{auth}$. At step 493A, AP2 transmits the first keyed one-way message authentication code (MAC) of the random number C2 and a first successful status indicator to WC 220 in accordance with the mutual challenge-response protocol.

At step 494A, WC 220 generates a second keyed one-way message authentication code (MAC) of the random number C2, using the second shared secret key $K_{auth}$. At step 495A, WC 220 verifies that the first keyed one-way message authentication code (MAC) of the random number C2 matches the second keyed one-way message authentication code (MAC) of the random number C2. At step 496A, if the verification is unsuccessful, WC 220 transmits a second failure status indicator to AP2. At step 497A, WC 220 performs the primary authentication protocol with AP2.

Otherwise, at step 498A, WC 220 transmits a second successful status indicator to AP2 in accordance with the mutual challenge-response protocol.

At step 499A, WC 220 has successfully completed the secondary authentication protocol. Now, WC 220 and AP2 can use the first shared secret key $K_{wc}$ to encrypt communications transmitted between WC 220 and AP2.

Figure 6:
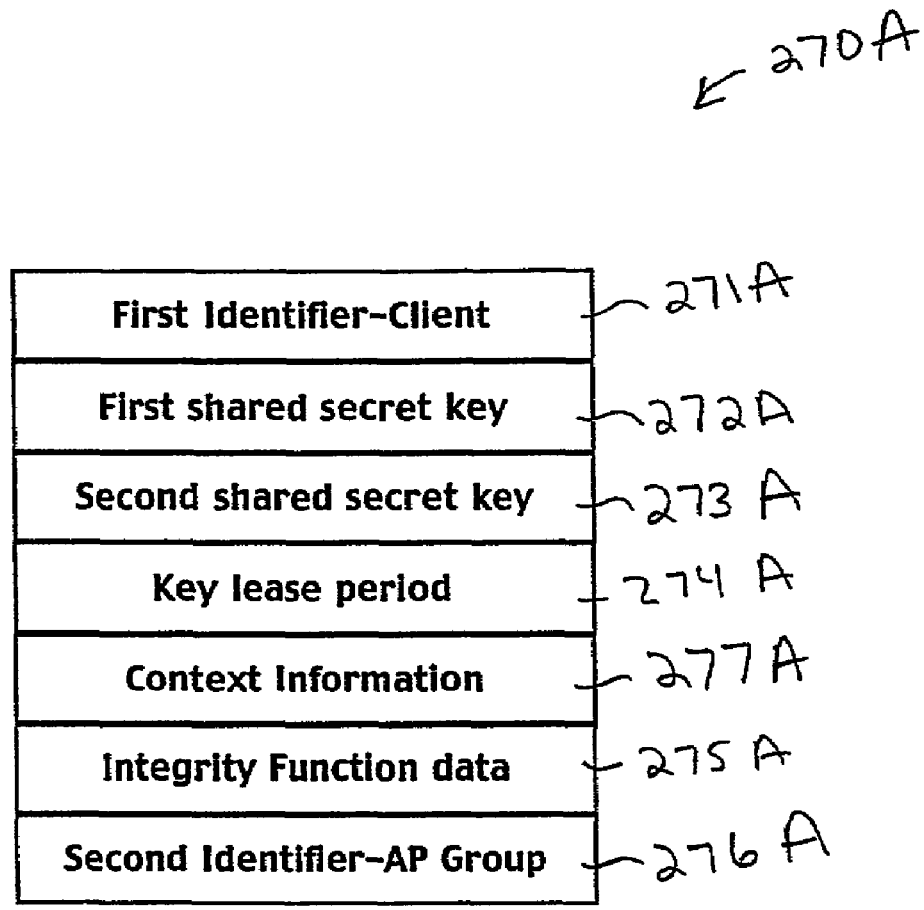
FIG. 6 illustrates a key lease 270A according to a second embodiment of the present invention.

FIG. 6 illustrates a key lease 270A according to a second embodiment of the present invention. Reference is made to FIG. 2. The key lease 270A can be utilized in the method 400 illustrated in FIG. 4 and in the method 400A illustrated in FIG. 5. The key lease 270A includes a first identifier 271A associated with the WC 220 and utilized in the primary authentication protocol performed by the WC 220 with a first AP (e.g., AP1 210 or APX 215), the first shared secret key $K_{wc}$ 272A established in the primary authentication protocol with the first AP, and a second shared secret key $K_{auth}$ 273A for use in the secondary authentication protocol between the WC 220 and a second wireless network access point electronic system (second AP) (e.g., AP1 210 or APX 215). For example, the second shared secret key $K_{auth}$ 273A can be used to authenticate data communications transmitted between the WC 220 and the second wireless network access point electronic system in the secondary authentication protocol. In one embodiment, the first identifier 271A is a user identifier associated with the WC 220. The first shared secret key $K_{wc}$ 272A and the second shared secret key $K_{auth}$ 273A can be equivalent, thus minimizing the number of shared secret keys which need to be managed.

Moreover, the key lease 270A further comprises a key lease period 274A for indicating a length of time in which the key lease 270A is valid. During the lease key period 274A, the WC 220 can perform the secondary authentication protocol with the second AP instead of performing the primary authentication protocol. If the key lease period 274A expires, the WC 220 is required to perform the primary authentication protocol with the second AP. The key lease period 274A can be any length of time. For example, the key lease period 274A can be 24 hours, 8 hours, etc., whereas a long key lease period reduces the number of times that the WC 220 needs to perform the primary authentication protocol.

Moreover, the key lease 270A further comprises context information 277A. Context information 277A generally includes information other than cryptographic keys that is distributed during the primary authentication protocol. For example, in the primary authentication protocol, information such as accounting information, session timeout information, filtering information (e.g., for VLAN enforcement or firewall policy enforcement), etc. may be distributed. This type of information may otherwise be lost when the WC 220 de-authenticates with the first AP and then re-authenticates using the secondary authentication protocol with the second AP. Thus, if the secondary authentication protocol is successfully completed, the second AP can extract the context information 277A from the key lease 270A and use it as if the second AP had obtained the context information 277A by executing the primary authentication protocol.

The key lease 270A also comprises integrity function data 275A for determining an unauthorized change to a first portion of the key lease 270A. The integrity function data 275A is generated by processing the first portion of the key lease 270A with an integrity function. The integrity function data 275A is utilized to reveal any tampering with the first portion of the key lease 270A. In an embodiment, the first portion of the key lease 270A comprises the first identifier 271A, the first shared secret key $K_{wc}$ 272A, the second shared secret key $K_{auth}$ 273A, the key lease period 274A, and the context information 277A.

Furthermore, the key lease 270A also comprises a second identifier 276A associated with a particular wireless network access point electronic system group (e.g., 305, 310, 315, or 320 as illustrated in FIG. 3). The second identifier 276A facilitates dividing the plurality of wireless network access point electronic systems (e.g., AP1 210 and APX 215) into a plurality of wireless network access point electronic system groups (e.g., 305, 310, 315, or 320 as illustrated in FIG. 3). In an embodiment, a second portion of the key lease 270A is encrypted with a third shared secret key $K_{AP}$ corresponding to the second identifier 276A associated with the wireless network access point electronic system (e.g., AP1 210 and APX 215) with which the WC 220 performed the primary authentication protocol. In an embodiment, the second portion of the key lease 270A comprises the first identifier 271A, the first shared secret key $K_{wc}$ 272A, the second shared secret key $K_{auth}$ 273A, the key lease period 274A, the context information 277A, and the integrity function data 275A.

FIG. 7 illustrates a flow chart showing a method 700 of protecting communication security when using a key lease to re-authenticate after a primary authentication protocol has been performed in accordance with an embodiment of the present invention. Reference is made to FIGS. 2-6. As described above with respect to method 400 of FIG. 4 and to method 400A of FIG. 5, the WC 220 performs a quick re-authentication with the second AP by transmitting the key lease to the second AP and performing the secondary authentication protocol using the key lease (illustrated in FIGS. 2A and 6). The second shared secret key $K_{auth}$ of the key lease is utilized in the secondary authentication protocol. According to method 400 of FIG. 4 and to method 400A of FIG. 5, if the secondary authentication protocol is successfully completed, the WC 220 and the second AP use the first shared secret key $K_{wc}$ to protect communication traffic between the WC 220 and the second AP.

However, there is a replay threat to the communication traffic protected by the first shared secret key $K_{wc}$, if the WC 220 uses the same key lease at an AP (e.g., AP1 210 or APX 215 of FIG. 2) more than once. In particular, when the WC 220 de-authenticates with an AP, the AP generally discards the state information associated with that WC 220. This state information can have anti-replay information such as sequence numbers or Initialization Vectors (IVs) that have been used with the first shared secret key $K_{wc}$. For example, if IVs are generated as an increasing sequence or a permutation of an increasing sequence, they can be used to detect replays of data frames encrypted by the same key in the communication traffic between the WC 220 and the AP. If the same key lease is used more than once at an AP, the AP typically no longer has available the state information, after the first use of the same key lease at the AP, that prevents the AP from accepting data frames that are replayed, creating a communication security hazard. The method 700 of FIG. 7 provides a solution to this potential communication traffic replay threat. According to the method 700 of FIG. 7, the WC 220 and the AP compute a new session encryption key after each time they perform a quick re-authentication by executing the secondary authentication protocol using the key lease, whereas the session encryption key is used for encrypting communication traffic between the WC 220 and the AP.

At step 710, the WC 220 and the AP perform a quick re-authentication by executing the secondary authentication protocol using the key lease, as illustrated in method 400 of FIG. 4 and in method 400A of FIG. 5. The WC 220 transmits the lease key to the AP to initiate the quick re-authentication. As illustrated in FIGS. 4 and 5, the WC 220 generates a first random number and transmits it to the AP in the secondary authentication protocol. Moreover, the AP generates a second random number and transmits it to the WC 220 in the secondary authentication protocol.

Furthermore at step 715, it is determined whether the secondary authentication protocol was successfully completed. If the secondary authentication protocol was not successfully completed, the method 700 proceeds to step 725 where the WC 220 and the AP perform a comprehensive authentication by executing the primary authentication protocol.

Otherwise at step 720, if the secondary authentication protocol was successfully completed, both the WC 220 and the AP generate a session encryption key for encrypting communication traffic between the WC 220 and the AP. In an embodiment, the WC 220 and the AP use the second shared secret key $K_{auth}$ of the key lease, the first random number, the second random number, and a hash function to determine the session encryption key. In particular, the WC 220 and the AP apply a HMAC-MD5 algorithm and the second shared secret key $K_{auth}$ on a concatenation of the first random number and the second random number to determine the session encryption key, whereas this concatenation can be expressed with the concatenation operator "I" as first random number I second random number. Alternatively, the WC 220 and the AP apply a HMAC-SHA-1 algorithm and the second shared secret key $K_{auth}$ on a concatenation of the first random number and the second random number to determine the session encryption key. It should be understood that the session encryption key could be determined in any other manner.

In a second embodiment, separate session encryption keys for each direction of communication traffic between the WC 220 and the AP are computed. Both the WC 220 and the AP generate a first session encryption key for encrypting communication traffic from the WC 220 to the AP and generate a second session encryption key for encrypting communication traffic from the AP to the WC 220. The WC 220 and the AP can use the second shared secret key $K_{auth}$ of the key lease, the first random number, the second random number, a first media access control (MAC) address associated with the WC 220, a second media access control (MAC) address associated with the AP, and a hash function to determine the first and second session encryption keys.

For computing the first session encryption key for encrypting communication traffic from the WC 220 to the AP, the WC 220 and the AP can apply a HMAC-MD5 algorithm and the second shared secret key $K_{auth}$ on a concatenation of the first random number, the second random number, the first media access control (MAC) address associated with the WC 220, and the second media access control (MAC) address associated with the AP to determine the first session encryption key, whereas this concatenation can be expressed with the concatenation operator "I" as first random number I second random number I first MAC I second MAC. Alternatively, the WC 220 and the AP can apply a HMAC-SHA-1 algorithm and the second shared secret key $K_{auth}$ on a concatenation of the first random number, the second random number, the first media access control (MAC) address associated with the WC 220, and the second media access control (MAC) address associated with the AP to determine the first session encryption key.

For computing the second session encryption key for encrypting communication traffic from the AP to the WC 220, the WC 220 and the AP can apply a HMAC-MD5 algorithm and the second shared secret key $K_{auth}$ on a concatenation of the first random number, the second random number, the second media access control (MAC) address associated with the AP, and the first media access control (MAC) address associated with the WC 220 to determine the second session encryption key, whereas this concatenation can be expressed with the concatenation operator "I" as first random number I second random number I second MAC I first MAC. Alternatively, the WC 220 and the AP can apply a HMAC-SHA-1 algorithm and the second shared secret key $K_{auth}$ on a concatenation of the first random number, the second random number, the second media access control (MAC) address associated with the AP, and the first media access control (MAC) address associated with the WC 220 to determine the second session encryption key. It should be understood that the first and second session encryption keys could be determined in any other manner. For example, another identifier associated with the WC 220 can be used instead of the first MAC. Moreover, another identifier associated with the AP can be used instead of the second MAC.

Those skilled in the art will recognize that the aspects of the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or palmtop computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in an electronic system (e.g., computer system, personal digital assistant, etc.). In addition, although the various methods of the present invention described above are conveniently implemented in an electronic system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of re-authenticating and protecting wireless communication security comprising the steps of:
   a) performing a secondary authentication protocol between a wireless client electronic system (client) and a wireless network access point electronic system (AP) using a key lease generated by performance of a primary authentication protocol, wherein said key lease includes a key lease period for indicating a length of time in which said key lease is valid for using said secondary authentication protocol instead of said primary authentication protocol, and wherein the secondary authentication protocol includes the steps of:
      a(i) transmitting said key lease from said client to said AP;
      a(ii) generating a first random number associated with said client and a second random number associated with said AP, wherein said key lease includes an encryption key for use in said secondary authentication protocol; and
      a(iii) transmitting said first random number to said AP and said second random number to said client; and
   b) if said secondary authentication protocol is successful, generating a session encryption key for encrypting communication traffic between said client and said AP, wherein the generating comprises:
      b(i) applying a hash function and said encryption key to said first random number and said second random number to determine said session encryption key.

2. A method as recited in claim 1 wherein said hash function is a HMAC-MD5 algorithm and wherein said hash function and encryption key are applied to a concatenation of said first random number and said second random number to determine said session encryption key.

3. A method as recited in claim 1 wherein said hash function is a HMAC-SHA-1 algorithm and wherein said hash function and encryption key are applied to a concatenation of said first random number and said second random number to determine said session encryption key.

4. A method as recited in claim 1 wherein said step b) includes:
   generating a first session encryption key for encrypting communication traffic from said client to said AP; and
   generating a second session encryption key for encrypting communication traffic from said AP to said client.

5. A method as recited in claim 4 wherein said step b) includes:
   using said encryption key, said first random number, said second random number, a first media access control (MAC) address associated with said client, a second media access control (MAC) address associated with said AP, and the hash function to determine said first and second session encryption keys.

6. A method as recited in claim 5 wherein said hash function is a HMAC-MD5 algorithm and wherein said hash function and said encryption key are applied to a concatenation of said first random number, said second random number, said first media access control (MAC) address associated with said client, and said second media access control (MAC) address associated with said AP to determine said first session encryption key.

7. A method as recited in claim 5 wherein said hash function is a HMAC-SHA-1 algorithm and wherein said hash function and said encryption key are applied to a concatenation of said first random number, said second random number, said first media access control (MAC) address associated with said client, and said second media access control (MAC) address associated with said AP to determine said first session encryption key.

8. A method as recited in claim 5 wherein said hash function is a HMAC-MD5 algorithm and said hash function and said encryption key are applied to a concatenation of said first random number, said second random number, said second media access control (MAC) address associated with said AP, and said first media access control (MAC) address associated with said client to determine said second session encryption key.

9. A method as recited in claim 5 wherein said hash function is a HMAC-SHA-1 algorithm and said hash function and said encryption key are applied to a concatenation of said first random number, said second random number, said second media access control (MAC) address associated with said AP, and said first media access control (MAC) address associated with said client to determine said second session encryption key.

* * * * *